US009845384B2

(12) United States Patent
Cossu et al.

(10) Patent No.: US 9,845,384 B2
(45) Date of Patent: Dec. 19, 2017

(54) RUBBER COMPOUND FOR TYRE PRODUCTION

(71) Applicants: Giancarlo Cossu, Rome (IT); Gianluca Forte, Rome (IT)

(72) Inventors: Giancarlo Cossu, Rome (IT); Gianluca Forte, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/030,414

(22) PCT Filed: Dec. 19, 2014

(86) PCT No.: PCT/IB2014/067166
§ 371 (c)(1),
(2) Date: Apr. 19, 2016

(87) PCT Pub. No.: WO2015/092765
PCT Pub. Date: Jun. 25, 2015

(65) Prior Publication Data
US 2016/0280886 A1    Sep. 29, 2016

(30) Foreign Application Priority Data

Dec. 20, 2013   (IT) ............................. RM2013A0706

(51) Int. Cl.
| | |
|---|---|
| *C08K 5/37* | (2006.01) |
| *B60C 1/00* | (2006.01) |
| *C08K 3/04* | (2006.01) |
| *C08J 3/24* | (2006.01) |
| *C08K 5/18* | (2006.01) |
| *C08K 5/3437* | (2006.01) |
| *C08K 5/47* | (2006.01) |

(52) U.S. Cl.
CPC ................. *C08K 5/37* (2013.01); *B60C 1/00* (2013.01); *C08J 3/24* (2013.01); *C08K 3/04* (2013.01); *C08K 5/18* (2013.01); *C08K 5/3437* (2013.01); *C08K 5/47* (2013.01); *C08J 2309/06* (2013.01); *C08K 2201/019* (2013.01)

(58) Field of Classification Search
CPC .......... C08K 5/37; C08K 5/3437; C08K 5/18; C08K 5/47; C08K 3/04; C08K 2201/019; C08J 3/24; C08J 2309/06; B60C 1/00; Y02T 10/862
See application file for complete search history.

(56) References Cited

U.S. PATENT DOCUMENTS

| | | | |
|---|---|---|---|
| 3,645,935 A | 2/1972 | Scott | |
| 2011/0003932 A1* | 1/2011 | Steinhauser | ......... B60C 1/0016 524/571 |

FOREIGN PATENT DOCUMENTS

| | | |
|---|---|---|
| EP | 2 511 106 A1 | 10/2012 |
| WO | 2008/071208 A1 | 6/2008 |

OTHER PUBLICATIONS

Cohen, M.P., et al.; Encyclopedia of Polymer Science and Technology, 2004, p. 577-612.*
International Search Report for PCT/IB2014/067166 dated Apr. 30, 2015 [PCT/ISA/210].
Written Opinion for PCT/IB2014/067166 dated Apr. 30, 2015 [PCT/ISA/237].

* cited by examiner

*Primary Examiner* — Robert Jones, Jr.
(74) *Attorney, Agent, or Firm* — Sughrue Mion, PLLC

(57) ABSTRACT

A rubber compound for tyres comprising a cross-linkable unsaturated chain polymer base comprising, in turn, at least a rubber of synthetic origin, a silica-free filler at least partially comprising carbon black, a vulcanization system and a mercapto carboxylic acid.

12 Claims, No Drawings

RUBBER COMPOUND FOR TYRE PRODUCTION

CROSS REFERENCE TO RELATED APPLICATIONS

This application is a National Stage of International Application No. PCT/IB2014/067166 filed Dec. 19, 2014, claiming priority based on Italian Patent Application No. RM2013A000706 filed Dec. 20, 2013, the contents of all of which are incorporated herein by reference in their entirety.

TECHNICAL FIELD

The present invention relates to a rubber compound for tyre production. The compound forming the subject of the present invention is characterized by a simultaneous improvement of its mechanical characteristics, rolling resistance and processability.

BACKGROUND ART

There is increasing market demand for tyres with low rolling resistance. In this regard, part of the research in the tyre field is concentrated on finding solutions capable of achieving lower rolling resistance without compromising other characteristics of the tyre, such as, for example, the mechanical and/or processability characteristics. In fact, it is known that improving performance in terms of rolling resistance causes a simultaneous deterioration in the mechanical and processability characteristics.

Strangely enough, the applicant has produced a solution to obtain rubber compounds that exhibit an improvement in terms of rolling resistance and, at the same time, an improvement in the mechanical and processability characteristics.

DISCLOSURE OF INVENTION

The subject of the present invention is a rubber compound for tyres comprising a cross-linkable unsaturated chain polymer base comprising, in turn, a rubber of synthetic origin, a silica-free filler at least partially comprising carbon black, and a vulcanization system; said compound being characterized in that it comprises a mercapto carboxylic acid.

Here and in the following, the term "cross-linkable unsaturated chain polymer base" means any natural or synthetic non-cross-linked polymer able to assume all the chemical-physical and mechanical characteristics typically taken by elastomers following cross-linkage (vulcanization) with sulphur-based systems.

Here and in the following, vulcanization system means a complex of ingredients comprising at least sulphur and accelerator compounds, which are added in the final mixing phase of compound preparation for the purpose of facilitating the vulcanization of the polymer base once the compound is subjected to a vulcanization temperature.

Preferably, said mercapto carboxylic acid has the —$CO_2H$ and —SH functional groups spaced apart by a chain consisting of 4 to 40 atoms.

Preferably, said mercapto carboxylic acid has the following formula (I)

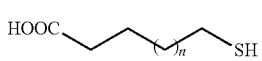

where n ranges from 1 to 37

Preferably, said mercapto carboxylic acid is $HOOCCH_2CH_2 (CH_2)_7CH_2SH$

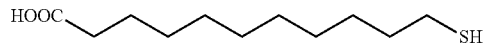 [SMILES: O=C(O)CCCCCCCCCCS]

Preferably, said mercapto carboxylic acid is present in the compound in a quantity ranging from 0.05 to 10 phr.

Preferably, said filler is composed exclusively of carbon black.

Preferably, the carbon black is of the type indicated by codes N1 or N3 according to the ASTM D1765 Standard.

Preferably, said cross-linkable unsaturated chain polymer base comprises a rubber of synthetic origin. The synthetic rubber can have a solid or liquid form.

A further subject of the present invention is a tyre portion produced with the above-defined compound.

Yet a further subject of the present invention is a tyre comprising a portion produced with the above-defined compound.

A further subject of the present invention is a method for the production of rubber compounds for the preparation of a tyre portion; said rubber compound comprising a cross-linkable unsaturated chain polymer base at least partially comprising a rubber of synthetic origin, a silica-free filler at least partially comprising carbon black, and a vulcanization system; said method being characterized in that it comprises a pretreatment step wherein said rubber of synthetic origin and said carbon black are mixed in the presence of a mercapto carboxylic acid.

Preferably, in said pretreatment step, the rubber of synthetic origin is mixed exclusively with the carbon black and the mercapto carboxylic acid.

BEST MODE FOR CARRYING OUT THE INVENTION

For a better understanding of the invention, some embodiments are described below, purely by way of non-limitative example.

EXAMPLES

A comparison compound (compound A) and a compound according to the present invention (compound B) were produced, the composition of compound B being the same as that of compound A except for the presence of mercapto carboxylic acid.

Compounds A and B were prepared according to a standard procedure, which is not relevant for the purposes of the present invention.

Preparation of the Compounds
(First Mixing Step)

Before starting the mixing, the ingredients shown in Table I were loaded into a mixer, with tangential rotors and an internal volume of between 230 and 270 liters, reaching a filling factor in the range 66-72%.

The mixer was operated at a speed of 40-60 rpm and the mixture that was formed was discharged once a temperature in the range 140-160° C. was reached.

(Second Mixing Step)

The mixture obtained in the previous step was processed again in the mixer, which was operated at speed of 40-60 rpm, and subsequently discharged once a temperature in the range 130-150° C. was reached.

(Third Mixing Step)

The vulcanization system, as indicated in Table I, was added to the mixture obtained from the previous step, reaching a filling factor in the range 63-67%.

The mixer was operated at a speed of 20-40 rpm and the mixture that was formed was discharged once a temperature in the range 100-110° C. was reached.

In addition, another compound (compound C) was prepared according to the invention. Compound C differed from the other compound according to the invention (compound B) in the preparation procedure used. The applicant has found that further advantages can be achieved with the implementation of a pretreatment step for the rubber of synthetic origin. This pretreatment step provides for the synthetic rubber to be mixed with carbon black and mercapto carboxylic acid separately from the other ingredients.

The preparation procedure is the same as that described above for compounds A and B regarding the (first, second and third) mixing steps, while a preliminary pretreatment step is provided, this being implemented under identical conditions to those described above for the first mixing step.

Table 1 lists the composition of the compounds in phr and indicates the steps in which the ingredients were added.

TABLE I

|  | Compound A | Compound B | Compound C |
|---|---|---|---|
| Pretreatment steps | | | |
| S-SBR | — | — | 100 |
| CB | — | — | 34 |
| Mercapto carboxylic acid | — | — | 3.0 |
| First mixing step | | | |
| Pretreated S-SBR | — | — | 137 |
| S-SBR | 100 | 100 | — |
| CB | 34 | 34 | — |
| Mercapto carboxylic acid | — | 3.0 | — |
| ZnO | 4.0 | — | — |
| Stearic acid | 1.5 | — | — |
| 6PPD | | 1.0 | |
| TMQ | | 0.5 | |
| Third mixing step | | | |
| Sulphur | | 2.8 | |
| TBBS | | 0.6 | |

S-SBR is a styrene-butadiene rubber in solution with a mean molecular weight between 800 and 1500×10³ and between 500 and 900×10³ respectively; a styrene content of between 10 and 45%, a vinyl content of between 20 and 70% and an oil content of between 0 and 30%.

The CB used was N330.

6PPD is the compound N-1,3-dimethyl-butyl-N'-phenyl-paraphenylenediamine, with an antidegradant function.

TMQ is the compound poly(1,2-dihydro-2,2,4-trimethylquinoline, with an antidegradant function.

TBBS is the compound N-tert-butyl-2-benzothiazole sulfenamide, with a vulcanization accelerant function.

The mercapto carboxylic acid used is:

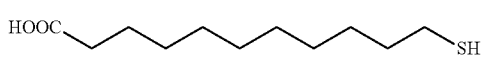 [SMILES: O=C(O)CCCCCCCCCCS]

The three compounds were subjected to experimental tests to verify the advantages of the compound according to the present invention with respect to the comparison compound.

In particular, the three compounds were subjected to tests regarding mechanical and dynamic properties. The mechanical properties were measured in accordance with the ASTM D412C Standard, while the dynamic properties were measured in accordance with the ISO 4664 Standard.

As an expert in the field will know, the rolling resistance parameter is closely related to tan δ values at 60° C.: the smaller the tan δ value at 60° C., the better the rolling resistance.

The parameters known as "bound rubber" and "X-link density" were also measured.

The bound rubber parameter is commonly used in the literature as an indicator of the polymer-filler chemical-physical interaction; the test is performed on non-vulcanized samples and the fraction of the compound that is not solubilised after treatment in THF (24 hours at room temperature) is usually determined.

The X-link density parameter is a measure of the level of cross-linkage of the compound. This measurement is obtained through swelling measurements on the vulcanized compound in organic solutions.

Table II lists the values of the experimental tests performed, indexed to the values of comparison compound A.

TABLE II

|  | Compound A | Compound B | Compound C |
|---|---|---|---|
| TB | 100 | 96 | 96 |
| M50 | 100 | 119 | 123 |
| M200 | 100 | 150 | 154 |
| M300 | 100 | 140 | 144 |
| E'Mpa (60° C.) 1% | 100 | 105 | 105 |
| Tan δ (60° C.) 1% | 100 | 88 | 84 |
| E'Mpa (RT) 1% | 100 | 101 | 101 |
| Tan δ (RT) 1% | 100 | 82 | 84 |
| Bound Rubber | 100 | 3160 | 3860 |
| X-link density | 100 | 152 | 152 |

From the values listed in Table II, it can be clearly seen that with respect to the comparison compound, the compounds produced according to the present invention exhibit a simultaneous improvement in terms of rolling resistance and in terms of mechanical properties.

Moreover, strangely enough, it has been found that in addition to exhibiting the advantages revealed above by the values listed in Table II, the compounds forming the subject of the present invention also exhibit improved processability due to the efficacious adhesion of the compounds to the rollers during calendering and/or extrusion operations. In fact, as an expert in the field will know, an improvement in the rolling resistance of rubber compounds is generally accompanied by deterioration in processability due to the low stickiness of the compound on the rollers of the mills feeding the calenders and/or extruders.

From the data listed in Tables I and II, it can be seen that the compounds forming the subject of the present invention also have the advantage of not needing stearic acid and ZnO, without this causing deterioration in the compound's dynamic and mechanical properties. The advantages regarding the possibility of not using stearic acid and ZnO lies substantially in lower production costs and in lower weight for the compound.

In conclusion, the applicant has found, strangely enough, that the use of a mercapto carboxylic acid in a rubber compound for tyres is capable of improving the compound in terms of rolling resistance, mechanical and processability properties, and, at the same time, enables the use of stearic acid and ZnO to be avoided.

The invention claimed is:

1. A rubber compound for tyres comprising a cross-linkable unsaturated chain polymer base comprising at least a rubber of synthetic origin, a silica-free filler at least partially comprising carbon black, and a vulcanization system; said compound being characterized in that it comprises a mercapto carboxylic acid, wherein said mercapto carboxylic acid has the —CO$_2$H and —SH functional groups spaced apart by a chain consisting of 4 to 40 atom, said rubber compound being prepared by a method comprising a pre-treatment step wherein said rubber of synthetic origin and said carbon black are mixed in the presence of a mercapto carboxylic acids.

2. A rubber compound according to claim 1, characterized in that said mercapto carboxylic acid has the following formula (I)

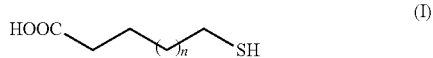

wherein n ranges from 1 to 37.

3. A rubber compound according to claim 1, characterized in that said mercapto carboxylic acid is

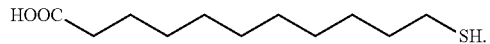

4. A rubber compound according to claim 1, characterized in that said mercapto carboxylic acid is used in the compound in a quantity ranging from 0.05 to 10 phr.

5. A rubber compound according to claim 1, characterized in that said filler consists exclusively of carbon black.

6. A rubber compound according to claim 1, characterized in that the carbon black is of the type indicated by codes N1 or N3 according to the ASTM D1765 Standard.

7. A rubber compound according to claim 1, characterized in that it is without stearic acid and ZnO.

8. A rubber compound according to claim 1 comprising carbon black N330, N-1,3-dimethyl-butyl-N'-phenyl-para-phenylenediamine, poly(1,2-dihydro-2,2,4-trimethyl quinoline, N-tert-butyl-2-benzothiazole sulfenamide and wherein said rubber of synthetic origin is styrene-butadiene rubber in solution with a mean molecular weight between 500 and 1500×10$^3$; a styrene content of between 10 and 45%, a vinyl content of between 20 and 70% and an oil content of between 0 and 30% and wherein said mercapto carboxylic acid is:

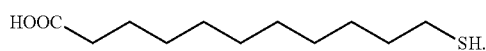

9. A tyre portion characterized in that it is manufactured with a compound according to claim 1.

10. A tyre characterized in that it comprises a tyre portion according to claim 8.

11. A method for the production of rubber compounds for the preparation of a tyre portion; said rubber compound comprising a cross-linkable unsaturated chain polymer base at least partially comprising a rubber of synthetic origin, a silica-free filler at least partially comprising carbon black, and a vulcanization system; said method being characterized in that it comprises a pretreatment step wherein said rubber of synthetic origin and said carbon black are mixed in the presence of a mercapto carboxylic acid.

12. A method for the production of rubber compounds according to claim 11, characterized in that in said pretreatment step, the rubber of synthetic origin is mixed exclusively with the carbon black and the mercapto carboxylic acid.

* * * * *